United States Patent
Taguchi et al.

[11] Patent Number: 5,547,215
[45] Date of Patent: Aug. 20, 1996

[54] AIRBAG SYSTEM

[75] Inventors: Masahiro Taguchi, Hazu-gun; Kazutaka Katoh, Okazaki; Masatada Yoshida, Ichinomiya, all of Japan

[73] Assignee: Nippondenso Co., Ltd., Kariya, Japan

[21] Appl. No.: 415,508

[22] Filed: Apr. 3, 1995

[30] Foreign Application Priority Data

Apr. 4, 1994 [JP] Japan ........................... 6-65962

[51] Int. Cl.$^6$ .................................................. B60R 21/16
[52] U.S. Cl. ............................................ 280/732; 280/730.1
[58] Field of Search .................................. 280/730.1, 732, 280/743.2

[56] References Cited

U.S. PATENT DOCUMENTS

| | | | |
|---|---|---|---|
| 3,819,204 | 6/1974 | Oka et al. | 280/730.1 |
| 4,169,613 | 10/1979 | Barnett | 280/732 |
| 4,832,287 | 5/1989 | Werjefelt | 280/732 |
| 5,306,043 | 4/1994 | Mihm et al. | 280/732 |
| 5,310,214 | 5/1994 | Cuevas | 280/730.1 |
| 5,348,341 | 9/1994 | Webber | 280/732 |

FOREIGN PATENT DOCUMENTS

| | | |
|---|---|---|
| 4-108457 | 3/1992 | Japan . |
| 4-193645 | 7/1992 | Japan . |
| 4-303048 | 10/1992 | Japan . |
| 5-213135 | 8/1993 | Japan . |

*Primary Examiner*—Kenneth R. Rice
*Attorney, Agent, or Firm*—Cushman, Darby & Cushman

[57] ABSTRACT

An airbag of an airbag system is formed by sewing an edge of at least one piece of cloth two-dimensionally like a balloon. An airbag installation hole which introduces gas from an inflator into the airbag is off set from a center position of the airbag in back and forth direction of a vehicle to be away from a vehicular occupant. The airbag system is installed in an interior component of a vehicle so that the airbag inflates upwards rather than horizontally. When the airbag is inflated completely, the airbag projects towards the vehicular occupant because the airbag installation hole is formed in the off-centered position. Therefore, it is possible to fill a gap efficiency in front of the vehicular occupant with the inflated airbag and protect the vehicular occupant sufficiently.

11 Claims, 8 Drawing Sheets

AIRBAG SYSTEM

CROSS REFERENCE TO RELATED APPLICATION

This application is based upon and claims priority from Japanese Patent Application No. Hei. 6-65962 filed Apr. 4, 1994, the contents of which are incorporated herein by reference.

BACKGROUND OF THE INVENTION

1. Field of the Invention

The present invention relates to an airbag system for protecting a vehicular occupant by softening shock of a vehicle collision with using an airbag inflated when the vehicle collision takes place.

2. Related Art

An Airbag system is already known as a vehicular occupant protective system to protect a vehicular occupant in case of a vehicle collision. The airbag system is composed of a sensor for detecting a vehicle collision, an inflator for erupting gas based on a signal from the sensor and an airbag that inflates with the gas erupted from the inflator, etc.

When a vehicle comes into collision, the airbag inflates with the gas between the vehicular occupant and interior components of the vehicle, such as a dashboard or a steering wheel located in front of the vehicular occupant. The inflated airbag softens shock to the vehicular occupant when the vehicular occupant collides with these interior components. For the vehicular occupant on a passenger seat, it is preferable to inflate the airbag directly towards the vehicular occupant to protect effectively, because at the passenger seat, a distance between the vehicular occupant and a position in which the airbag can be installed is greater than that at the driver seat. Thus, in the prior art, the airbag system is installed at the center of the dashboard facing the vehicular occupant of the passenger seat. This is so-called mid-mount form. Particularly, if the airbag which has a small air capacity is used to protect the vehicular occupant of the passenger seat, the mid-mount form is generally adopted.

However, even if the airbag system is sufficiently compact by using the airbag of the small air capacity, installing the airbag system at the center of the dashboard restricts flexibility of structures and shapes of other components to be installed inside the dashboard. In addition, the airbag may strike and damage the vehicular occupant's face because the airbag inflates directly towards the vehicular occupant's face. To solve such problems, installing an airbag system in an upper part of the dashboard is proposed. In this case, an inflator which erupts gas to an airbag is arranged in the upper part of the dashboard so that the airbag inflates along a windshield of the vehicle first, then a gap between the passenger and interior components such as the dashboard is filled with the inflated airbag.

However, the following problems arise if the airbag system is installed and operated as described above. For instance, in case of an airbag system having an airbag which is sewed two-dimensionally, the airbag is more likely to be hindered from inflating by the windshield. Moreover, interference between the airbag and the windshield obstructs inflation of the airbag, thus the gap between the vehicular occupant and interior components such as the dashboard cannot be sufficiently filled with the inflated airbag. As a result, it is difficult to sufficiently absorb the shock to the vehicular occupant at the vehicle collision.

Even if the airbag system can be installed in the upper part of the dashboard, to solve the above problems, an airbag disclosed in Japanese Patent Application Laid-Open No. Hei. 4-193645 can be employed. This airbag is formed by sewing s three pieces of cloths three-dimensionally in such a way that the airbag matches shapes of surrounding components like the windshield when the airbag inflates. This improves flexibility in selection of installation area for the airbag system.

However, employing a three-dimensionally sewed airbag to enable installation of the airbag system in the upper part of the dashboard, like the conventional system, will require additional processes in manufacture of airbags, thus resulting in increasing manufacturing costs.

SUMMARY OF THE INVENTION

It is an object of the present invention to provide an airbag system which can protect a vehicular occupant sufficiently, without any increase in complexity of manufacture of an airbag and in manufacturing costs of the airbag system, even if the airbag system is installed in an upper part of an dashboard.

In order to attain the object, the airbag system according to the present invention has an airbag formed by sewing a peripheral edge of at least one piece of cloth two-dimensionally like a bag of a balloon. An airbag installation hole which introduce gas erupted from an inflator into the airbag is located off center so that a position of the airbag installation hole is away from the vehicular occupant than a center position of the airbag in back and forth direction of the vehicle. The airbag system is installed in an interior component of a vehicle so that the airbag inflates upwards rather than horizontally.

With the airbag system constructed as described above, the number of manufacturing processes does not increase because the airbag is formed two-dimensionally like a bag or a balloon. The airbag is inflated upwards in an early stage of an inflation thereof. Thus, the airbag does not strike and damage a vehicular occupant. When the airbag is inflated completely, the airbag projects towards the vehicular occupant because the airbag installation hole is formed in an off-centered position described above. Therefore, it is possible to fill the gap efficiency in front of the vehicular occupant with the inflated airbag and to protect the vehicular occupant sufficiently.

The airbag system can be installed in an upper part of a dashboard of the vehicle when protecting a vehicular occupant on a passenger seat. In the airbag system for protecting the vehicular occupant on the passenger seat, the airbag installation hole is located off center so that the inflated airbag leans to the vehicular occupant of the passenger seat rather than a windshield. Thus, the gap between the vehicular occupant and the dashboard can be filled properly with the inflated airbag because an inflation of the airbag is not hindered by the windshield.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

DETAILED DESCRIPTION OF THE PREFERRED EMBODIMENTS

The present invention will be described in detail with reference to the embodiments.

Figure 1:
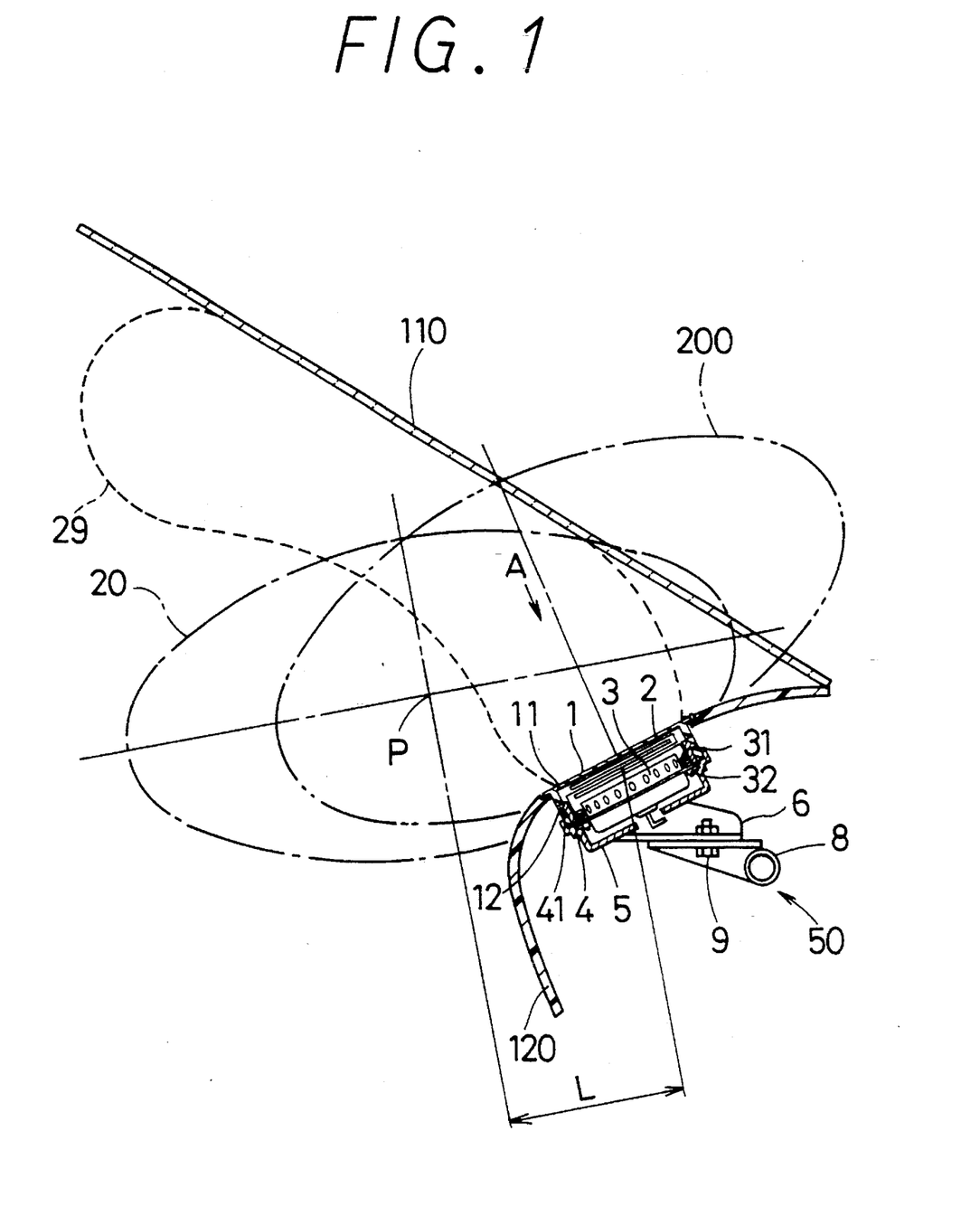
FIG. 1 is a partial cross-sectional view of the airbag system in the first embodiment.
Figure 2:
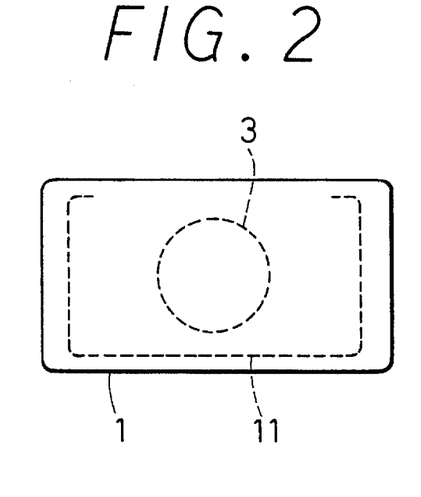
FIG. 2 is a front view of the airbag system, seen from the direction of an arrow A in FIG. 1.
Figure 3:
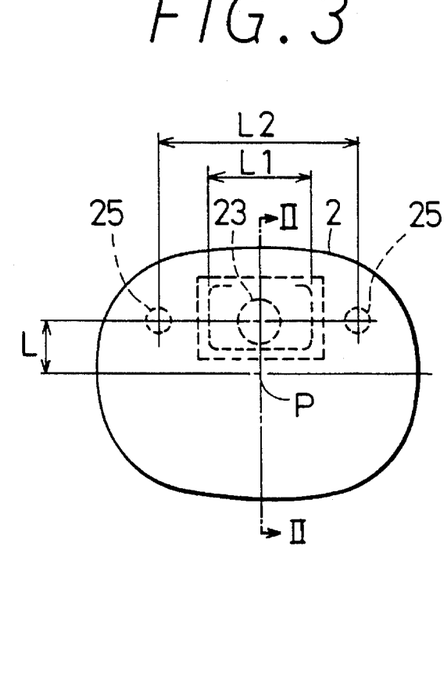
FIG. 3 is a front view of the airbag in the first embodiment.
Figure 4:
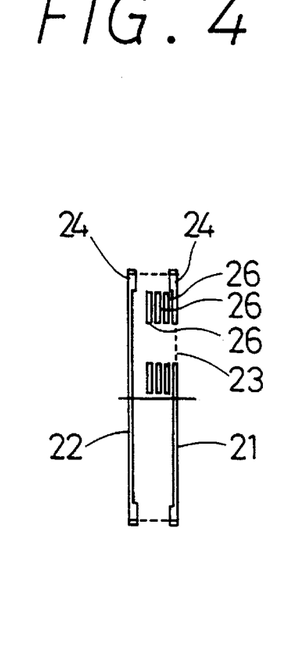
FIG. 4 is a cross-sectional view of the airbag taken on line 11—11 of FIG. 3.

The first embodiment of the present invention is explained based on FIG. 1 to FIG. 4. FIG. 1 is a partial cross-sectional view illustrating an airbag system installed in a vehicle. FIG. 2 is a front view of the airbag system, seen from the direction of an arrow A in FIG. 1. FIG. 3 is a top view of the airbag and FIG. 4 is a cross-sectional view of the airbag used in first embodiment.

A structure of the airbag system 50 in the first embodiment is described below.

Lid 1 is used for case 4 which contains airbag 2 and inflator 3 etc. Lid 1 has thin lip line 11 which is torn during an inflation of airbag 2. Lid 1 is secured by hooking a plurality of holes 12 provided at the external circumference of lid 1 on a plurality of ratchets 41 provided at the external circumference of case 4.

Inflator 3 is disk-like shaped and secured to case 4 with retainer 31 and nut 32.

Airbag 2 consists of upper cloth 22 and lower cloth 21 having airbag installation hole 23 and vent holes 25. As shown FIG. 4, circumferences 24 of lower cloth 21 and upper cloth 22 are sewed together. Airbag installation hole 23 is used to introduce gas from inflator 3 into airbag 2 and to secure airbag 2 to case 4. Reinforced cloth 26 is sewed around airbag installation hole 23, on which stress is concentrated when airbag 2 is inflated, to improve strength of airbag installation hole 23.

As shown in FIG. 1 and FIG. 3, airbag installation hole 23 is provided in a position away from the center position P of airbag 2 by a distance L towards windshield 110. Distance L means an off set volume. Distance L is determined according to shapes of interior components of a vehicle etc., in particular, an inflating direction of airbag 2 decided by the airbag system installation position, and an angle of windshield 110. Distance L2 between two vent holes 25 is set greater than distance L1 of an opening width of lid 1 so that vent holes 25 will not be blocked by lid 1 during the inflation of airbag 2.

Airbag system 50 structured as described above uses bolts (not shown in the figures) to secure case 4 and cover 5 to stay 6. Stay 6 is secured to fixture 8 inside dashboard 120 with using bolt 9. Thus, airbag system 50 is installed at an upper part of dashboard 120 of the vehicle.

The following is a description of an operation of airbag system 50 described above.

Airbag 2 inflates when gas is supplied from inflator 3 in case of a vehicle collision. Thin lip line 11 formed at lid 1 is broken up due to pressure from airbag 2. In an early stage of an inflation of airbag 2, airbag 2 inflates along windshield 110. This is because inflator 3 is located approximately horizontally at the upper part of dashboard 120. A spouting direction of gas from inflator 3 is changed by case 4 to spout towards windshield 110. Airbag 2 inflates as indicated by dotted line 29 in FIG. 1 when it reaches out to its maximum.

Airbag 2 then inflates completely as indicated by dot-dash line 20 before the vehicular occupant collides with airbag 2. This is because airbag installation hole 23 of airbag 2 is off set to be closer to windshield 110 by distance L and the inflation of the airbag 2 is not hindered by windshield 110. When airbag 2 inflates completely as indicated by dot-dash line 20, almost no interference occurs between airbag 2 and windshield 110, thus airbag 2 projects extensively towards the vehicular occupant side.

The following is a description of the effects of the first embodiment.

Airbag 2 used in the first embodiment is manufactured by sewing circumferences 24 of two cloths 20, 21 having the same shape two-dimensionally, as shown in FIGS. 1, 3 and 4. This way simplifies a manufacturing of airbag 2 thus results in cost reduction, compared to way in which more than three cloths are sewn three-dimensionally or way in which two cloths are used and one cloth is formed into a cylinder shape and sewn three-dimensionally to form an airbag.

Even if airbag 2 which is inexpensive and sewn two-dimensionally as described above is used in airbag system 50, which inflates airbag 2 upwards from the top of dashboard 120, airbag 2 in completely inflated state indicated by dot-dash line 20 projects extensively towards the vehicular occupant side, because airbag installation hole 23 is provided in the off-centered position as described earlier. If airbag installation hole 23 is not provided in such an off-centered position, airbag 2 inflates like the conventional shape indicated by dot-dot-dash line 200. Thus, the part illustrated exceeding beyond windshield 110 towards the outside of the vehicle does not inflate smoothly due to interference with windshield 110. Moreover, the gap in front of the vehicular occupant cannot be filled with airbag 2 sufficiently, thus shock exerted on the vehicular occupant may not be absorbed properly.

However, according to the first embodiment, airbag installation hole 23 is set to the above-mentioned off-centered position so that interference with windshield 110 is almost eliminated as shown in FIG. 1, and airbag 2 can inflate considerably towards the vehicular occupant. Thus, it is possible to fill the gap between the vehicular occupant and interior components such as dashboard 120 with airbag 2.

Furthermore, apart from when a large-capacity airbag is used in airbag system 50, a large space between the vehicular occupant and dashboard 120 at the passenger seat can also be filled with a small-capacity airbag.

Moreover, installing airbag system 50 at the upper part of dashboard 120 prevents airbag 2 from inflating in straight line towards the vehicular occupant, thus eliminating collision with the vehicular occupant's face etc. by airbag 2 and limiting damage to the vehicular occupant which may result from inflation of airbag 2. In addition, flexibility in structures and shapes of other interior components to be installed inside dashboard 120 can be improved. For instance, it is possible to have a large storage box, which is often provided at the center of dashboard 120.

The second embodiment of this invention is explained below. Description for the same structure, operation and effects as in the first embodiment will be omitted for brevity.

Figure 5:
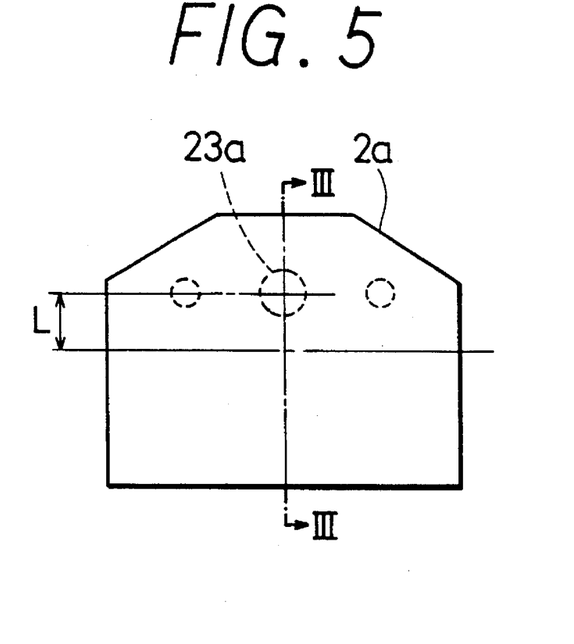
FIG. 5 is a front view of the airbag in the second embodiment.
Figure 6:
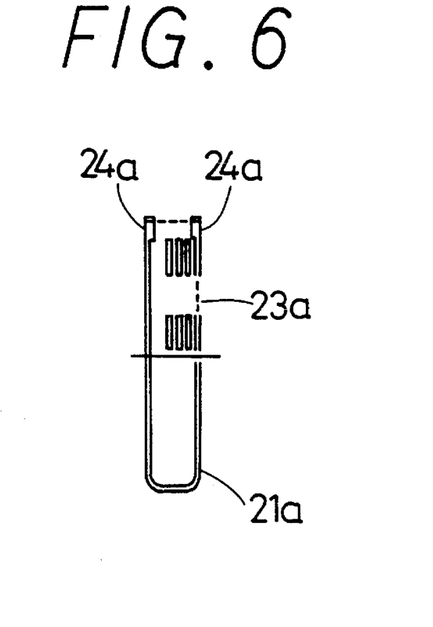
FIG. 6 is a cross-sectional view of the airbag taken on line 111—111 of FIG. 5.

The second embodiment of this inventions is shown in FIG. 5 and FIG. 6. FIG. 5 is a top view showing airbag 2a of this embodiment and FIG. 6 is a cross-sectional view of airbag 2a taken on line 111—111 in FIG. 5.

In the case of airbag 2 of the first embodiment, two cloths (upper cloth 21 and lower cloth 22) are used and their edges are sewed to form airbag 2, while in the case of airbag 2a of the second embodiment, cloth 21a is folded to sew the circumference 24a of the airbag 2a as shown in FIG. 6. Airbag installation hole 23a, to which gas is supplied from inflator 3, is provided closer to windshield 110 by distance L in back and forth direction of the vehicle. Moreover, airbag 2a does not have to be formed into a circle or oval shape when viewed from the front side, it can be formed into a shape similar to a square and rectangle or other shapes like pentagonal or hexagonal shape.

Having the same structure as explained above can have the same effects as the first embodiment. In addition, forming airbag 2a by folding cloth 21a shortens the distance for two-dimensional sewing, thereby resulting in simplifying a manufacturing of airbag 2a. Thus, manufacturing costs for airbag system 50 can also be reduced. Furthermore, since a sewing portion of airbag 2a does not exist at passenger's side when airbag 2a inflates, the passenger is not injured by a sewing portion of airbag 2a.

The third embodiment of the present invention is explained below.

Figure 7:
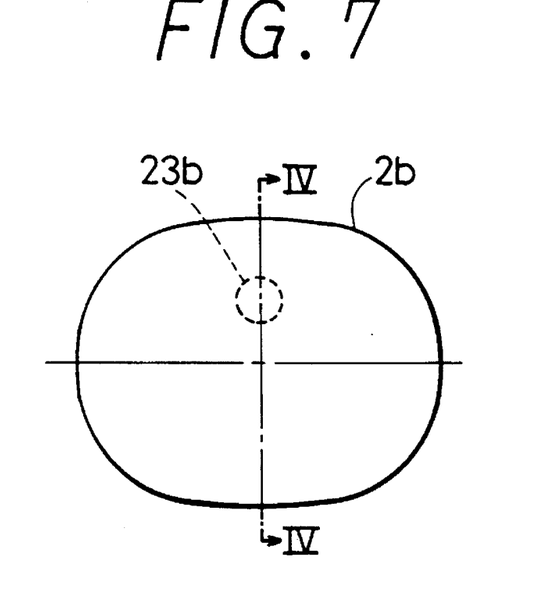
FIG. 7 is a front view of the airbag in third embodiment.
Figure 8:
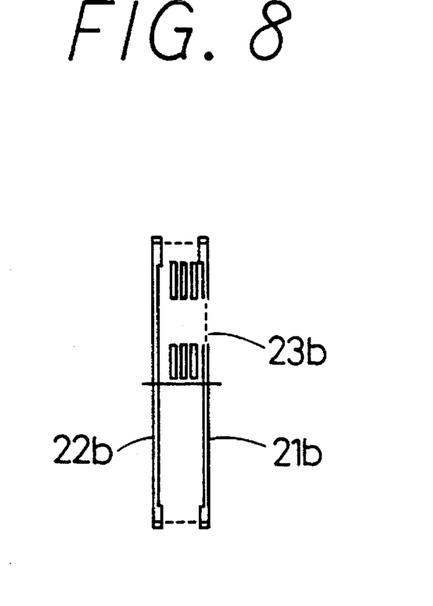
FIG. 8 is a cross-sectional view of the airbag taken on line IV—IV of FIG. 7.

FIG. 7 is a front view showing airbag 2b used in the airbag system 50 of the third embodiment, and FIG. 8 shows a cross-sectional view of airbag 2b taken on line 1V—IV in Fig. 7.

The third embodiment uses a certain kind of cloths for lower cloth 21b and upper cloth 22b which compose airbag 2b. This cloths allow gas contained in airbag 2b to be released through their texture. Since gas is released from the texture, it is not necessary to have vent holes designed to release an appropriate amount of gas from airbag 2b to absorb shock exerted when airbag 2b collides with the vehicular occupant. Thereby, only airbag installation hole 23 is formed in lower cloth 21b.

Use of airbag 2b described above in airbag system 50 also provides the same effects as the first embodiment and eliminates the need for providing vent holes, which has been provided conventionally, thus resulting in simplifying the manufacturing of airbag 2b.

Next, the fourth embodiment of the present invention is explained below.

Figure 9:
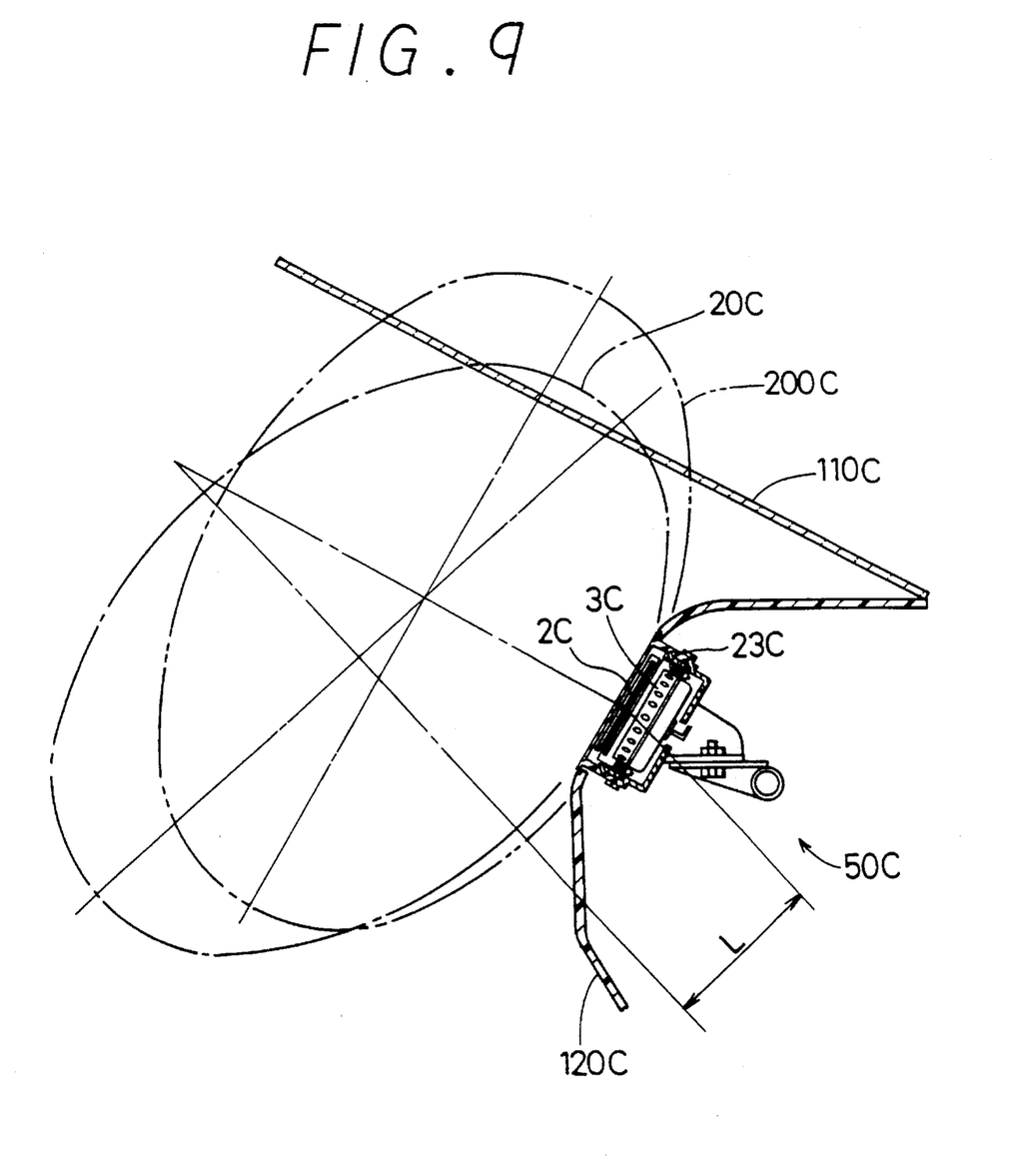
FIG. 9 is a partial cross-sectional view of the airbag system in fourth embodiment.

FIG. 9 is a partial cross-sectional view of the airbag system 50c in the fourth embodiment. Airbag system 50c is installed in a position slightly below the upper part of dashboard 120c, not like the first embodiment where it is installed on the top of dashboard 120. Installing airbag system 50c in this way will cause airbag 2c to inflate slightly more directly towards the vehicular occupant compared to the first embodiment. For airbag 2c to be used in airbag system 50c installed in this way, the airbag 2 described in detail in the first embodiment can be used. However, it is also possible to use airbag 2a, 2b described in detail in the second or third embodiments.

The following is a description of an operation of airbag system 50c to be installed in the above-mentioned way.

When gas is supplied to airbag 2c from inflator 3c as a result of vehicle collision, airbag 2c inflates in the same manner as the first embodiment. In the early stage of the inflation of airbag 2c, airbag 2c inflates almost in parallel to windshield 110c. This is because airbag system 50c is installed in a position slightly below the upper part of dashboard 120c.

Airbag 2c then inflates completely as indicated by dot-dash line 20c before the vehicular occupant collides with airbag 2c. This is because airbag installation hole 23c is provided closer to windshield 110c from the center of airbag 2c by distance L. When airbag 2c inflates completely as indicated by dot-dot-dash line 200c, almost no interference occurs between airbag 2c and windshield 110c. Thus airbag 2c projects extensively towards the vehicular occupant side because the inflation of airbag 2c is not instructed by windshield 110c.

The following is a description of the effects of the fourth embodiment.

Even if airbag 2c sewed two-dimensionally as explained earlier is used and airbag system 50c is installed in the above-mentioned position of dashboard 120c, airbag 2c in completely inflated state indicated by dot-dash line 20c will projects towards the vehicular occupant as shown FIG. 9 because fourth embodiment has airbag installation hole 23c, to which gas is supplied from inflator 3c, in the off-centered position as described earlier. Thus, airbag 2c inflates smoothly and the gap between the vehicular occupant and interior components such as dashboard 120c can be filled with inflated airbag 2c.

Next, the fifth embodiment of the present invention is explained below based on FIG. 10.

Figure 10:
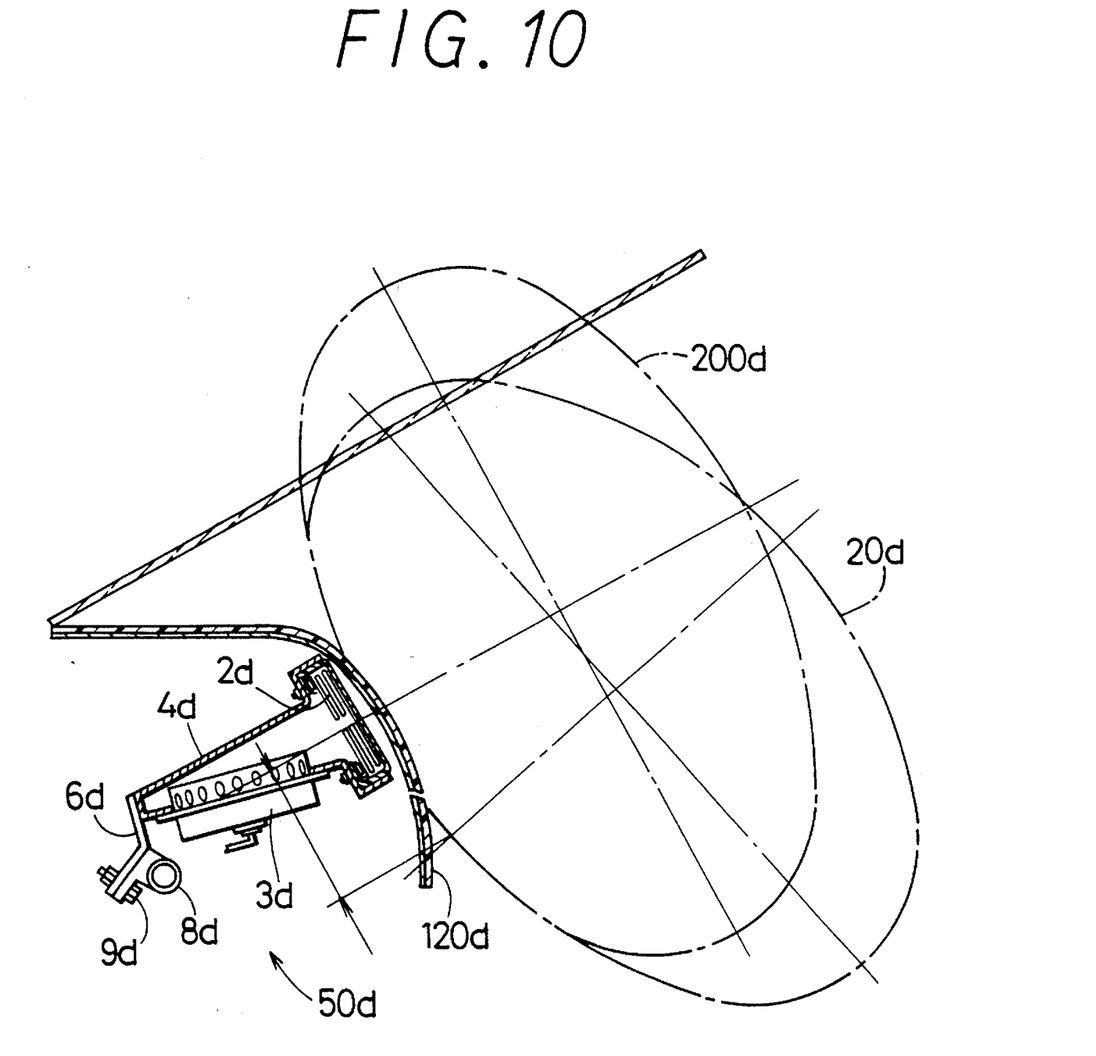
FIG. 10 is a partial cross-sectional view of the airbag system in fifth embodiment.

FIG. 10 shows an example of an installation position of inflator 3d when airbag system 50d is installed in a position slightly below the top surface of dashboard 120d. That is, inflator 3c is installed in parallel to the inner wall of dashboard 120c in the fourth embodiment, while inflator 3d is installed almost in parallel to the top surface of dashboard 120d in the fifth embodiment. That is, inflator 3d is installed in dashboard 120d so that inflator 3d is positioned at right angle to lid 1d of dashboard 120d. Airbag 2d explained in the first, second and third embodiments will still be used even if airbag system 50d having inflator 3d is installed in the position slightly below the top surface of dashboard 120d.

According to the fifth embodiment, the same operation nd effects as the fourth embodiment can be obtained, and in addition flexibility in arrangements of other components inside dashboard 120d can be further improved.

Next, the sixth embodiment of this invention is explained below based on FIG. 11.

This embodiment shows an example in which strap 28 is attached inside airbag 2e having airbag installation hole 23e, which is provided in the off-centered position, as described in the first, second and third embodiments.

Figure 11:
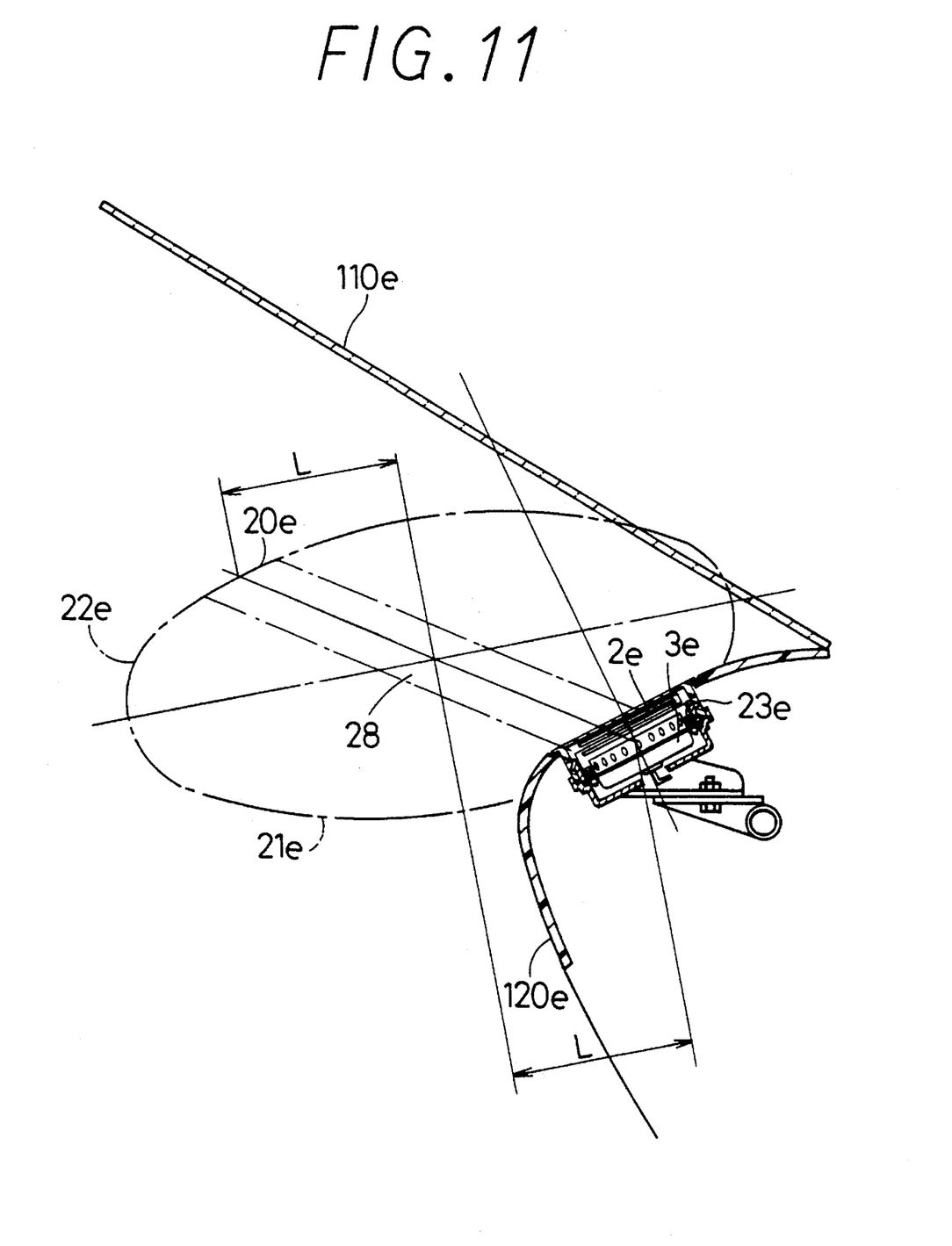
FIG. 11 is a partial cross-sectional view of the airbag system in sixth embodiment.

As shown in FIG. 11, one end of strap 28 is secured to a position on upper cloth 22e symmetrical to airbag installation hole 23e, with the center of airbag 2e as the center of symmetry. The other end of strap 28 is sewn to lower cloth 21e together with reinforced cloth (not illustrated in FIG. 11) which is sewed around airbag installation hole 23e.

Because of strap 28 provided inside airbag 2e, airbag 2e is expected to inflate as far as the length of strap 28, then immediately inflates completely as indicated by dotted line 20e, while it inflates along windshield 110e by being supplied gas from inflator 3e in the case of vehicle collision.

Thus, the gap between the vehicular occupant and interior components such as dashboard 120e can be filled more quickly with airbag 2e, even if airbag 2e inflates upwards.

The present invention is not limited to the embodiments described above but can be changed in various ways as described below.

Figure 12:
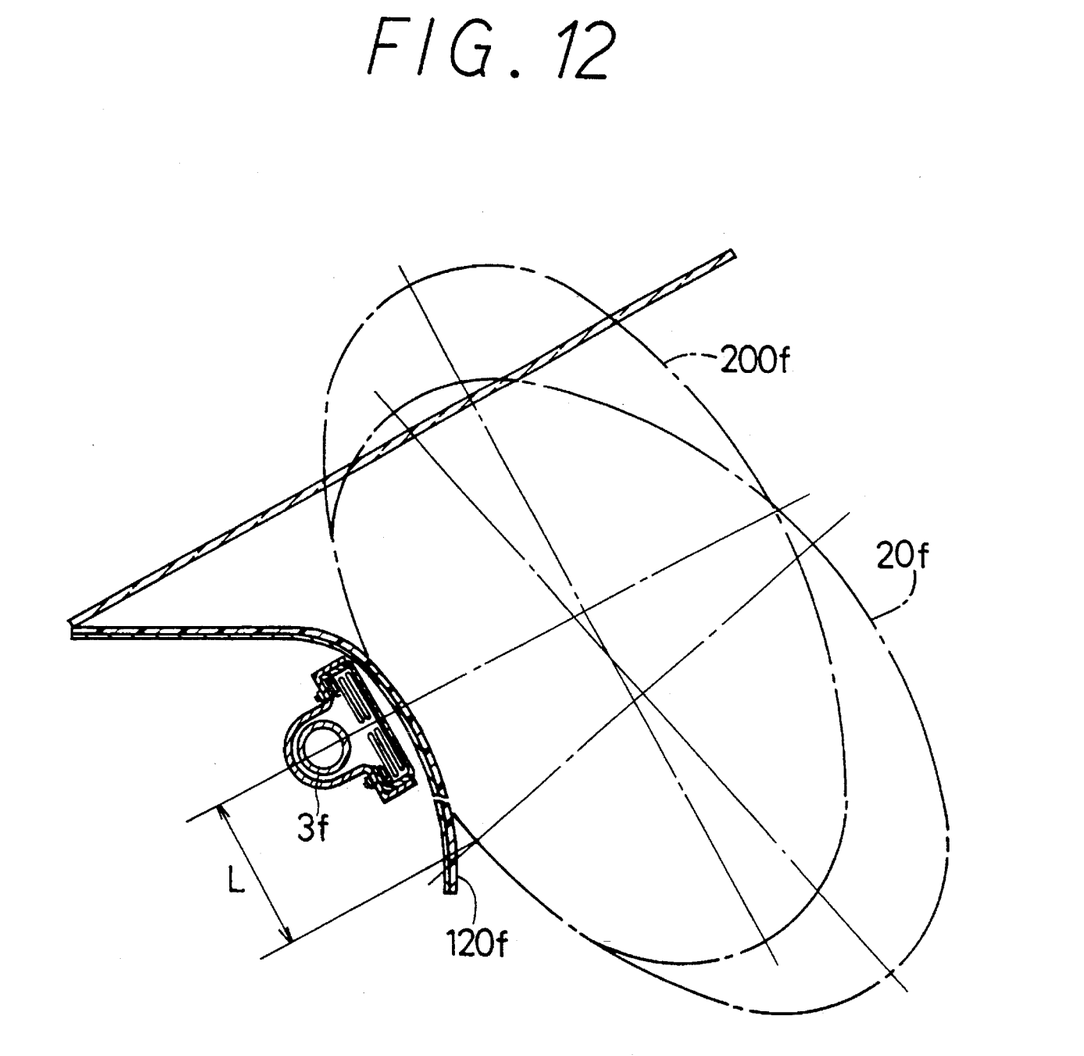
FIG. 12 is a partial cross-sectional view of the airbag system in seventh embodiment.

For instance, the present invention can be applied to airbag system 50 having cylindrical inflator 3f as shown in FIG. 12 as a seventh embodiment. This enables use of an airbag system having a different shape from that of the first, fourth and fifth embodiments, thus flexibility in structure or arrangement inside dashboard 120f can be improved.

Figure 13:
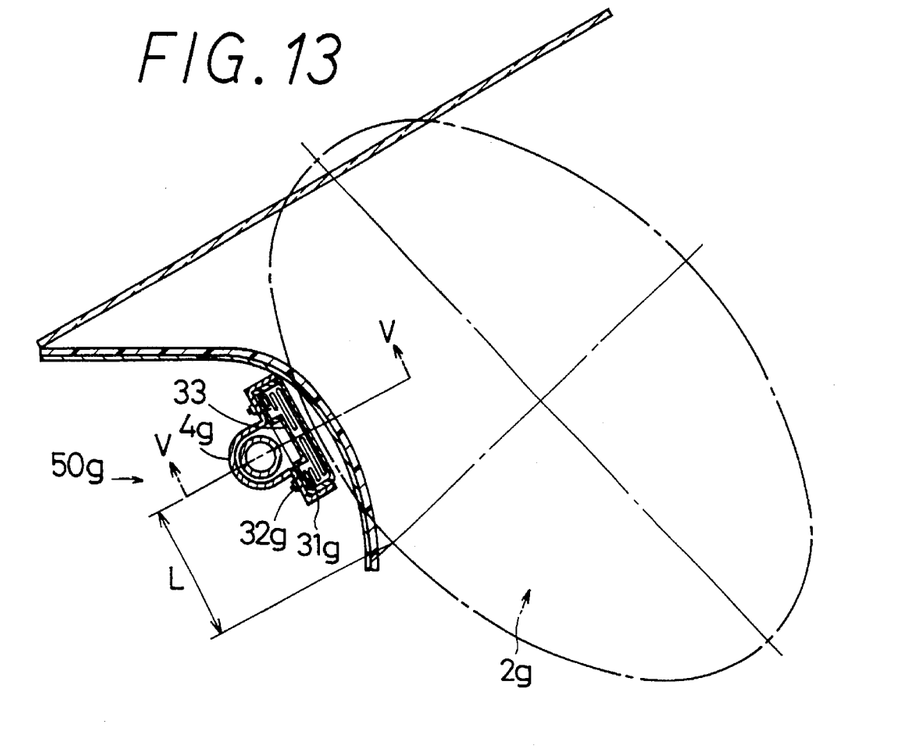
FIG. 13 is a partial cross-sectional view of the airbag system in eighth embodiment.
Figure 14:
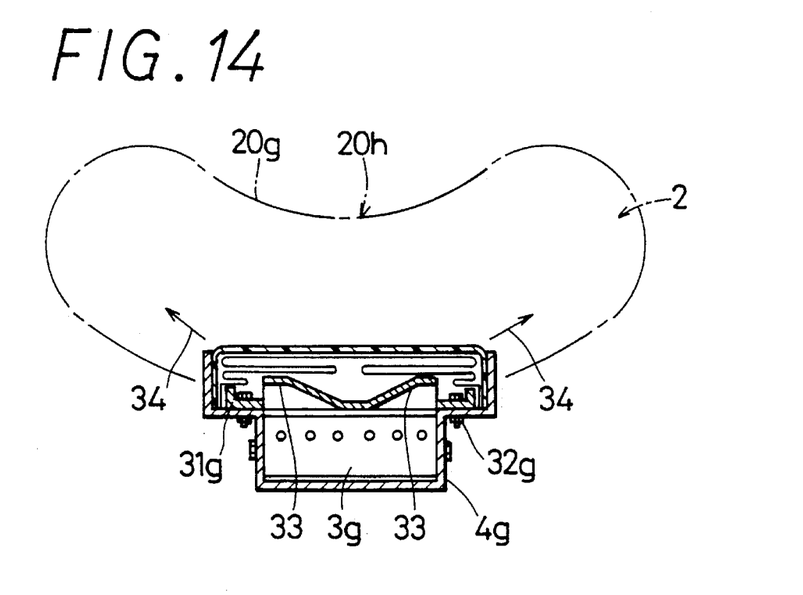
FIG. 14 is a cross-sectional view of the airbag system taken on line V—V of FIG. 13.

Moreover, as shown in FIG. 13 and FIG. 14, the present invention can be applied to airbag system 50g having plate 33 which is provided in case 4 and allows gas from inflator 3g to be discharged in only crosswise direction of the vehicle as an eighth embodiment. FIG. 14 is a cross-sectional view of airbag system 50 taken on line V—V in FIG. 13.

Plate 33 is assembled with retainer 31g used to install and secure airbag 2g into one unit. Plate 33 allows gas from inflator 3g to be discharged in directions of arrows 34 only so that the gas can be distributed in crosswise direction of the vehicle. When gas is discharged in this way, airbag 2g inflates as indicated by dot-dash line 20g in the early stage of inflation, thus airbag's tip 20h can be restricted from projecting. This prevents airbag's tip 20h from striking the passenger's face strongly even if airbag 2g inflates towards the passenger's face depending on passenger's position during inflation of airbag 2g.

Cylindrical inflator 3f described in FIG. 12 is adopted in FIG. 13, however, it is also possible to adopt any of inflator 3-3e and airbag system 50-50e described in the first to sixth embodiments. Moreover, the structure using plate 33 can also be applied to any of airbag system 50-50e described in the first to sixth embodiments, and the same effects can be obtained.

What is claimed is:

1. An airbag system installed in a vehicle, comprising:

an inflator which generates gas when the vehicle crashes;

an airbag inflatable by the gas from the inflator, the airbag having an installation hole through which the gas flows into the airbag;

a retainer, attached to the inflator and the airbag, which secures the inflator and the airbag to the vehicle; and a plate, fixed to the retainer, which allows the gas introduced through the installation hole of the airbag to be discharged into the airbag only in a crosswise direction of the vehicle.

2. An airbag system as claimed in claim 1, wherein the airbag is formed by sewing an edge of at least one piece of cloth two-dimensionally so that the airbag turns into a bag shape when the airbag is inflated, and the installation hole of the airbag is offset from a center position of the airbag along a longitudinal axis of the vehicle to be away from the vehicle occupant.

3. An airbag system as claimed in claim 2, wherein the airbag is formed by folding one cloth then sewing the edge of the cloth together into a bag shape.

4. An airbag system as claimed in claim 3, wherein the one cloth is folded symmetrically along a folding line.

5. An airbag system as claimed in claim 2, wherein the airbag system has a strap of which one end is secured to a position near the airbag installation hole on an inner surface of the airbag and the other end is secured to a position located symmetrically, when said airbag is inflated, to the airbag installation hole with the airbag center position.

6. An airbag system as claimed in claim 2, wherein the airbag system is installed in an upper part of a dashboard facing a passenger seat of the vehicle.

7. An airbag system as claimed in claim 6, wherein the inflator is positioned in parallel to a surface of the dashboard.

8. An airbag system as claimed in claim 6, wherein the inflator is positioned at right angle to a surface of the dashboard.

9. An airbag system as claimed in claim 2, wherein the airbag is composed of first and second cloths and formed by sewing an edge of first cloth to an edge of second cloth into a bag shape.

10. An airbag system as claimed in 2, wherein the airbag system is installed in an interior component of the vehicle so that the airbag inflates upwards rather than horizontally.

11. An airbag system as claimed in claim 1, wherein the airbag inflates along an inclined surface of a windshield in front of the passenger seat in the early stage of an inflation thereof.

* * * * *